United States Patent Office 3,184,110
Patented May 18, 1965

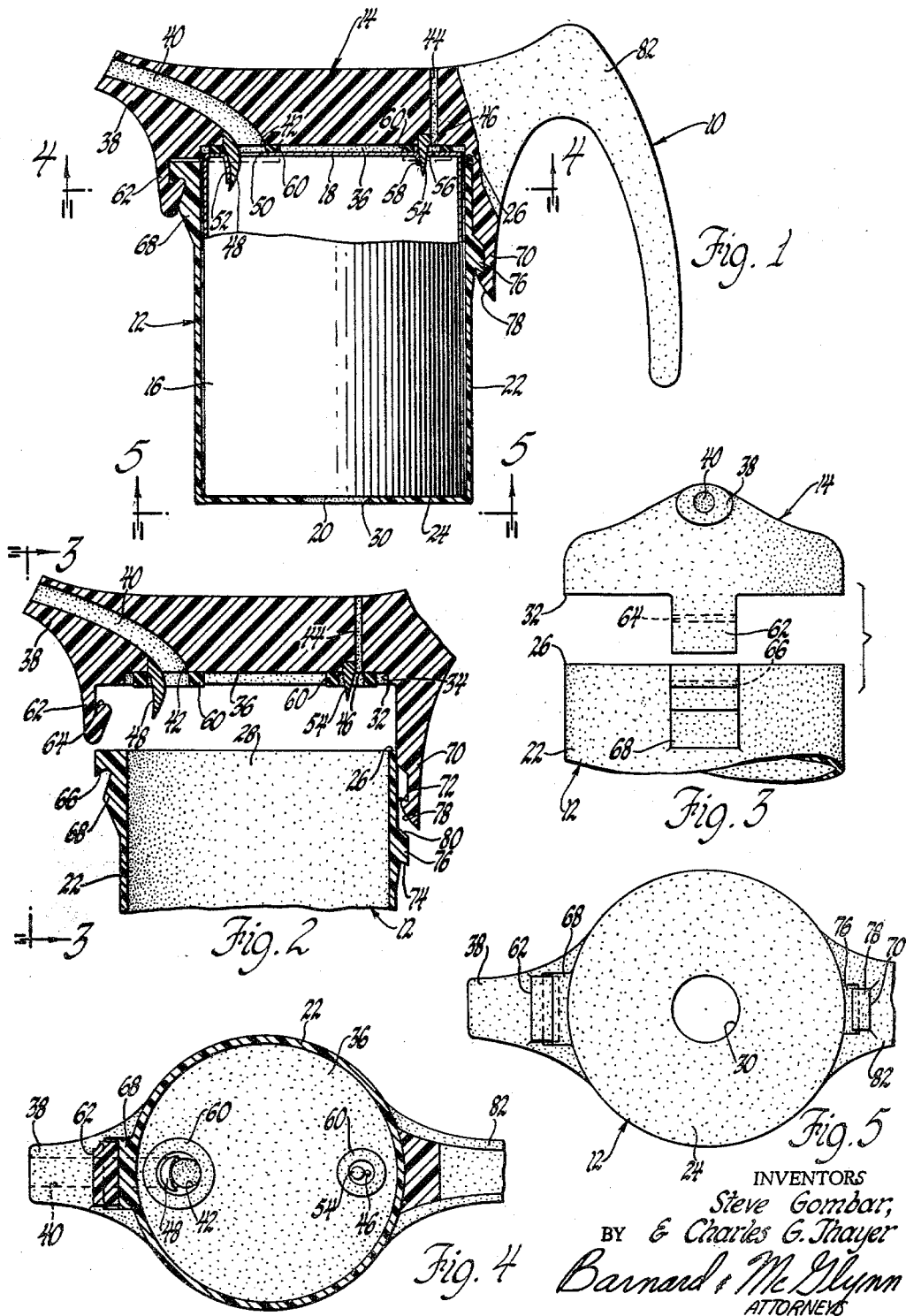

3,184,110
PITCHER ASSEMBLY FOR A LIQUID CONTAINER
Steve Gombar, Royal Oak, and Charles G. Thayer, Clawson, Mich., assignors of thirty-three and one-third percent to Gabriel L. Dery, Madison Heights, Mich.
Filed Nov. 29, 1962, Ser. No. 240,940
1 Claim. (Cl. 222—86)

This invention relates to a pitcher assembly for removably receiving and holding a liquid container and dispensing the contents thereof and, in particular, relates to a pitcher assembly of the general type aforementioned comprising a pitcher body adapted to removably receive a liquid container, such as a can of condensed milk, juices and the like, and a pitcher top removably mountable on and releasably latchable to the pitcher body to enclose the container, the top being provided with a pouring spout and vent passage and punches associated therewith to automatically punch a liquid inlet opening and a vent opening in the top of the container communicating with such spout and vent passage upon mounting the pitcher top on the pitcher body.

Although the present invention may be used in conjunction with various types of liquid containers, whether of the metal or heavy paperboard type and containing various liquids such as milk, juices and the like, reference will be made hereinafter to metal liquid containers or cans of the type containing condensed milk and various juices to facilitate an understanding of the invention.

Thus, referring by way of example to a metal can of condensed milk, tomato juice or the like, it will be readily apparent that such liquids find wide usage today for cooking purposes, for use in coffee and tea or the like, for drinking and other such similar purposes. Containers or cans of this type are made ready for use by piercing or puncturing the top of the container to form one hole for pouring purposes and a second hole to vent the interior of the container whereby pouring of the liquid therefrom is facilitated. As will be recognized, the entire contents of a container of the type aforementioned are seldom emptied at once but, rather, are normally used over varying periods of days and, hence, preferably the pouring and vent openings in the top of the container are made as small as possible in order that impurities may be kept from entering the container during storage of same.

As a consequence, it commonly occurs that the pouring or vent openings, or both, in the top of the container become closed over by congealed liquid between each occasion of use, and this is particularly true where a container of condensed milk is involved. When this condition occurs, it is necessary that the pouring and vent openings in the container be reopened each time that it is desired to pour the liquid from the container, which requirement is both time-consuming and annoying. Additionally, since the pouring and vent holes preferably should be made as small as possible to keep impurities therefrom as aforementioned, it will be obvious that the rate of flow of a given liquid from its container is relatively slow. Furthermore, once they are opened and initially used, such containers present an extremely unattractive appearance either in view of some of the liquid collecting on the top of the container about its pouring opening, or due to excess liquid having run from the pouring opening down the side of the container, or both.

In view of the foregoing considerations, pitcher assemblies have heretofore been proposed in an effort to solve one or more of the problems aforementioned and, in general, have been of two types. In the first instance, one pitcher assembly of the general type aforementioned has characterized a pitcher body adapted to removably receive a liquid container having a puncturable top, and a top member permanently hingedly secured to an upper edge of the pitcher body and carrying a pair of punches thereon for automatically puncturing openings in the top of the container within the pitcher body upon closing the pitcher top thereon. However, difficulties have been presented with respect to pitcher assemblies of this type in cleaning them; that is, due to the fact that the cover is permanently hinged to the pitcher body, the entire assembly is difficult to handle and to clean. The other type of pitcher assembly has been substantially identical, generally speaking, to that aforedescribed except that the top member thereof has been completely freely removably mounted with respect to the pitcher body to solve the handling and cleaning problem aforementioned. However, in such an assembly, it often happens that the top member slides out of engagement with the pitcher body and drops into the bowl or other receptacle into which the liquid is being poured which, of course, is highly undesirable.

In addition, and irrespective of the particular type of pitcher assembly heretofore proposed as aforementioned, such assemblies have been characterized by top members equipped with a relatively elongate hollow punch to form the pouring opening in the top of the container within the assembly, whereby it is extremely difficult, if not impossible, to empty the entire contents of the container which must pass through such a hollow punch. Furthermore, difficulties have been encountered in such prior pitcher assemblies in removing an emptied container from the pitcher body.

Accordingly, it is a principal object and feature of this invention to provide a pitcher assembly for removably holding a liquid container having a puncturable top and for dispensing the contents of such container, and in which the pitcher assembly comprises a pitcher body having an opening at one end thereof adapted to removably receive a liquid container, a pitcher top member adapted to be completely removably mounted upon the pitcher body over the aforementioned opening therein and comprising a pouring spout and vent passage including associated punches for automatically punching pouring and vent openings in the top of the container upon mounting the top member on the pitcher body, yieldably compressible means acting between the top of a container within the pitcher body and the pitcher top member upon mounting the latter thereover, releasable latch means acting between the pitcher top member and body to releasably latch the former on the latter with the aforementioned compressible means compressed, whereby the force of the compressible means continuously biases the latch means into firm latching engagement and firmly retains the container against a bottom wall of the pitcher body, and a handle secured to and extending from the pitcher top member for manipulating the entire assembly in closing the container for pouring liquid from the latter.

It is yet another object and feature of this invention to provide a pitcher assembly of the type aforementioned wherein the aforementioned compressible means takes the form of a pair of suitable seals interposed and confined between a portion of the pitcher top member and the top of the container disposed within the pitcher body so as to surround and provide liquid and air tight communication between the pouring spout and vent passage and the liquid and vent openings punctured in the top of the container whereby, in addition to cooperation between the seals and the latch means to firmly engage the latter, the seals are firmly compressed to provide a tight seal.

It is yet another and more specific object and feature of this invention to provide a pitcher assembly of the type aforementioned wherein the aforementioned latch means comprises cooperable latch lugs and latch fingers carried respectively by the pitcher body and pitcher top member, and having relatively elongate latching surfaces so related to the axis of the pitcher body and the plane in which the handle projects from the pitcher top member so as to prevent any cocking or disengagement of such latch means during manipulation of the assembly.

It is yet another object and feature of this invention to provide a pitcher assembly of the type aforementioned further characterized in that the aforementioned pitcher body includes a base wall against which the bottom of a liquid container is adapted to rest, the base wall including an access opening through which a persons' finger or other object may be inserted to engage the bottom of an empty container to facilitate removal therefrom through the open end of the pitcher body.

These and other objects, features and advantages of the invention will appear more fully hereinafter as the description thereof proceeds, reference being made to the accompanying drawing in which:

FIGURE 1 is a vertical sectional view of a preferred embodiment of a pitcher assembly constructed in accordance with this invention, and illustrates the assembly in assembled relation to enclose a liquid container therein;

FIGURE 2 is a fragmentary sectional view corresponding generally to FIGURE 1, but illustrating the top of the pitcher assembly partially removed from the pitcher body and the liquid container removed from the latter;

FIGURE 3 is a fragmentary view taken on line 3—3 of FIGURE 2;

FIGURE 4 is a sectional view taken on line 4—4 of FIGURE 1, with the liquid container removed; and FIGURE 5 is a fragmentary view taken on line 5—5 of FIGURE 1.

Referring now to the drawings, the numeral 10 in FIGURE 1 generally indicates a pitcher assembly comprising an integral pitcher body indicated generally at 12 and the integral pitcher top member indicated generally at 14, the latter adapted to be removably mounted in latching engagement with the pitcher body in a manner to be described to completely encase a liquid container such as the cylindrical metal can 16 shown in FIGURE 1 and including a puncturable top panel 18 and a bottom panel 20. Preferably, the pitcher body and top member are molded integrally or otherwise formed from any suitable one of various well known lightweight plastic materials so as to minimize cost and result in an extremely lightweight assembly.

More specifically, the pitcher body 12 comprises a substantially cylindrically shaped axially extending continuous side wall 22 having a transversely extending base wall 24 at one axial end thereof on which the bottom panel 20 of the container 16 rests when inserted within the pitcher body, and a substantially continuous circular rim portion 26 at the upper or other axial end thereof defining a loading and unloading opening 28 for removably inserting the liquid container 16 into the pitcher body. A circular access opening 30 of considerably smaller diameter than the base wall 24 is formed through the latter for access to the interior of the pitcher body for a purpose to appear more fully hereinafter.

The integral pitcher top member 14 comprises a substantially continuous circular rim portion 32 adapted to removably seat upon the rim portion 26 of the pitcher body, and an annular or circular continuous wall member 34 extending axially inwardly of the top member from rim portion 32 and terminating at a substantially plane seating or sealing surface 36 to define a chamber into which the upper portion of the container 16 above the rim portion 26 of the pitcher body may project. The axial length of the wall member 34 and, hence, the extent that the seating or sealing surface 36 is recessed within the top member from the rim portion 32 of the latter may be varied considerably, but is preferably slightly greater than the axial distance by which the container top panel 18 projects axially beyond the rim portion 26 of the pitcher body.

The top member further includes a suitably shaped pouring spout 38 including a pouring passage 40 extending therethrough and terminating in a liquid inlet opening 42 communicating with the aforementioned seating or sealing surface 36 and the chamber defined in part thereby. In somewhat similar fashion, a vent passage 44 extends through another portion of the top member substantially diametrically opposite from the pouring passage 40 and terminates in a vent opening 46 likewise communicating with the seating or sealing surface 36 and the chamber defined in part thereby. A suitably shaped metal punch member 48, preferably made of stainless steel for hygienic purposes, is suitably molded or otherwise secured within the pitcher top member adjacent the liquid inlet opening 42 so as to extend axially therefrom a predetermined distance beyond the rim portion 32 of the top member whereby, upon mounting the top member on the pitcher body in a manner to be described to assume the position of FIGURE 1, the punch will form a punctured opening 50 within the top panel 18 of the liquid container 16 by punching the material 52 therefrom as clearly illustrated in FIGURE 1. In similar fashion, another punch 54, again preferably of stainless steel, is molded or otherwise suitably secured within the top member immediately adjacent the vent opening 46 so as to extend axially beyond or below the rim portion 32 of the top member whereby, upon installing the top member on the pitcher body to assume the position of FIGURE 1 and in a manner to be described, the punch will form a punctured opening 56 in the liquid container by puncturing the material 58 therefrom. As will be readily apparent, the openings 50 and 56 punched in the top panel 18 of the liquid container will be disposed substantially opposite to and communicate respectively with the liquid inlet opening 42 and vent opening 46, whereby the contents of the container may be poured through the pouring passage 40 upon tipping the entire assembly counterclockwise in FIGURE 1, the interior of the container being vented through the vent passage 44 to facilitate such pouring action.

In order to seal the respective liquid and air flow paths between the punctured top panel of the container and the pouring and vent passages, a pair of substantially conventional yieldably compressible annular seals 60 are suitably mounted on seating or sealing surface 36 so as to respectively surround the liquid inlet opening 42 and vent opening 46, their associated punches 48 and 54 and the openings 50 and 56 formed by the latter in the top panel of the liquid container. The respective seals 60 have substantially equal thicknesses and, in their uncompressed state as when the pitcher top member 14 is removed from seating engagement with the pitcher body 12 as illustrated in FIGURE 2, project axially from the seating or sealing surface 36 a predetermined distance beyond the plane of the rim portion 32 of the pitcher top member. Thus, with the pitcher top member mounted in operative relation to the pitcher body as illustrated in FIGURE 1, and due to the fact that the top panel 18 of the container 16 extends axially beyond the rim portion 32 of the top member, it will be apparent that the seals 60 are yieldably compressed from their uncompressed position as shown in solid lines in FIGURE 2 and in dotted lines in FIGURE 1 to the compressed solid line position of FIGURE 1. As a result of this action, not only is a very tight seal made about the liquid and vent openings 70 of the assembly as will be apparent, but the expansive force of the compressed seals serve to push and hold the bottom panel 20 of the container firmly against the base wall 24 of the pitcher body, and also cooperates with latching means to be described to maintain the latter in firm engagement.

In order to releasably latch the pitcher top member 14 upon the pitcher body 12 over the loading and unloading opening 28 in the latter as well as the top panel 18 of any container disposed therein, the pitcher top member includes a latch finger 62 depending from the spout 38 and including a hook like latch member having a latch surface 64 adapted to releasably latchingly engage with a latch surface 66 formed on a latch lug 68 projecting from the exterior side wall 22 of the pitcher body immediately below the rim portion 26 of the latter. Another latch finger 70 includes a latch surface 72 releasably latchingly engageable with a latch surface 74 formed on another latch lug 76 extending radially from the side wall of the pitcher body a predetermined distance below the rim portion thereof. The latch finger 70 is yieldably radially or laterally relative to the axis of the pitcher body 12 and top member 14 form an unstressed position thereof as illustrated particularly in FIGURES 1 and 2 to a radially or laterally outwardly bowed position in response to a cam surface 78 thereon camming against an upper surface 80 of the latch lug 76 during mounting of the pitcher top member on the pitcher body as will be described, at which time the latch finger 70 is permitted to spring back into operative latching engagement with the latch lug 76 as shown in FIGURE 1. As will be apparent, the aforedescribed latch lugs 68 and 76 are disposed substantially diametrically opposite from each other on the pitcher body while the latch fingers 62 and 70 are likewise disposed at diametrically opposite portions of the pitcher top member, and a handle member 82 extends radially from the pitcher top member generally in a vertical plane containing the aforementioned latch lugs and latching fingers whereby the handle member may be grasped to perform the pouring operation.

At this juncture, it should be noted that the respective cooperably releasably engageable latch fingers and their cooperating latch lugs are relatively elongate as illustrated particularly in FIGURES 3 through 5, and that the cooperating latch surfaces thereof extend substantially parallel to each other and are contained in a plane substantially perpendicular to the axis of the assembly. In addition, the axis of the handle member 82 projects from the pitcher top member in a vertical plane substantially perpendicular to the aforementioned plane of these latch surfaces and substantially intermediate the ends of the latter.

In operation, a container 16 will be mounted within the pitcher body 12 as illustrated in FIGURE 1 and the top member 14 will then be mounted thereon. In so mounting the top member, it is preferred that the latch surface 64 of latching finger 62 be first engaged against the latch surface 66 of the latch lug 68 with the top member extending upwardly and to the right in FIGURE 1 and the puncturing tips of the punches 48 and 54 posed above the top panel 18 of the container. At this time, the top member is pivoted down forceably toward the position illustrated in FIGURE 1 substantially about the axis of engagement of the latch surfaces of the latching finger 62 and the latch lug 68 as a pivot to puncture the top panel of the container and compress the seals 60 as previously described. During this action, the cam face 78 on the latching finger 70 will cam across the surface 80 of the latch lug 76, be bowed outwardly therefrom and ultimately snap back into latching position with the lug as illustrated in FIGURE 1, all automatically. While the configuration of the latching finger 62 and latch lug 68 may be designed so that the former may rotate freely in the latter during this mounting action, where such relative rotative movement is prevented by the configuration of these members, the latching finger 62 may be flexible to accommodate swinging movement of the top member 14 with respect to the body 12.

With the top member mounted on the pitcher body, it will now be apparent that the compressed seals 60 not only form a tight seal about the liquid pouring opening 42 and vent opening 46 but also function to hold the container 16 quite firmly against the base wall 24 of the pitcher body and continuously urge the respective latch surfaces of the latch fingers 62 and 70 into tight engagement with the latch surfaces of the latch lugs 68 and 76. Thus, and additionally due to the relatively elongate nature of the latch surfaces and their relationship to the handle member 82 as aforedescribed, there is no possibility for the top member and pitcher body to cock relative to each other or otherwise to inadvertently disengage the latching mechanism during manipulation of the assembly by use of the handle member.

When it is desired to remove an empty container from the assembly, it will be readily apparent that the cam face 78 of the latch finger 70 may be grasped and manually bowed radially outwardly from latching engagement with the lug 76, at which time the entire top member can be tipped counterclockwise in FIGURE 1 and the latch finger 62 disengaged from the latch lug 68. Thereafter, and as required, the user of the assembly may insert a finger, thumb or other object through the access opening 30 to facilitate removal of the container from the pitcher body.

While but one form of the invention has been shown and described, other forms will now be apparent to those skilled in the art. Therefore, it will be understood that the embodiment shown in the drawing and described above is merely for illustrative purposes, and is not intended to limit the scope of the invention which is defined by the claim which follows.

We claim:

A pitcher assembly for removably holding and dispensing the contents of a liquid container; said pitcher assembly comprising a pitcher body including a substantially continuous rim portion defining an opening in the upper end thereof through which a liquid container may be removably inserted within said body with the top of said liquid container projecting above said rim portion, a pitcher top member adapted to be removably mounted axially on said body over said opening therein and comprising a substantially continuous rim portion adapted to closely overlie said rim portion of said body, sealing surface means on said top member radially inwardly from said rim portion thereof and disposable opposite the top of a container within said body, said sealing surface means being recessed relative to said continuous rim portion of the top member and disposed a predetermined distance axially opposite the top of a container within said body, an annular wall member on said top member adapted to closely encircle the portion of a liquid container projecting from the pitcher body when said pitcher top member is mounted upon said body, means including a liquid inlet opening in said sealing surface means defining a pouring and dispensing spout extending through said top member, means including a vent opening in said sealing surface means spaced from said liquid inlet opening defining a vent passage extending through said top member, a pair of punches secured to said top member respectively adjacent said liquid inlet opening and said vent opening and extending axially beyond said rim portion of said top member to puncture openings in the top of a container within said body substantially respectively opposite said liquid inlet opening and vent opening upon mounting said top member upon said body, a pair of yieldably compressible seals seated against said sealing surface means and respectively surrounding said liquid inlet opening and said vent opening and their associated punches so as to surround the respective openings punctured in the top of a container, the uncompressed thicknesses of said seals being substantially greater than said predetermined distance between said sealing surface means and the top of a container whereby said said seals are yieldably compressed between said sealing surface means and the top of a container upon mounting said top member upon said body, cooperably engageable releasable latch means carried respectively by said top member and said body to releasably latch the former upon the latter solely in response to relative axial movement therebetween, said seals applying positive force against said top member and against the top of the container to bias the former away from the latter and maintain latching engagement of said latch means, and a handle extending from said top member.

References Cited by the Examiner

UNITED STATES PATENTS

| | | | |
|---|---|---|---|
| 2,535,783 | 12/50 | Churchill et al. | 222—86 |
| 2,544,095 | 3/51 | Kower | 222—86 |
| 2,547,311 | 4/51 | Genovese | 222—86 |
| 2,601,939 | 7/52 | Grob | 222—86 |
| 2,690,861 | 10/54 | Tupper | 222—498 |
| 2,877,918 | 3/59 | Gardner | 222—498 X |
| 2,919,835 | 1/60 | Butler | 222—86 |

FOREIGN PATENTS 97,509  11/39  Sweden.

RAPHAEL M. LUPO, *Primary Examiner.*

LOUIS J. DEMBO, *Examiner.*